United States Patent Office 3,781,259
Patented Dec. 25, 1973

---

3,781,259
POLYMERIZATION OF ACENAPHTHYLENE AND INDENE
Henry L. Hsieh, Bartlesville, Okla., assignor to Phillips Petroleum Company
No Drawing. Filed Sept. 29, 1970, Ser. No. 76,606
Int. Cl. C08f 7/02
U.S. Cl. 260—93.5 C        4 Claims

---

ABSTRACT OF THE DISCLOSURE

A method and catalyst for polymerizing acenaphthylene and indene employing a hydrocarbyl aluminum dihalide catalyst.

---

This invention relates to the polymerization of acenaphthylene and indene.

In one of its more specific aspects, this invention relates to the catalytic polymerization of acenaphthylene and indene and copolymerization of these monomers with isobutylene. In either instance, resinous polymers useful as fibers and films are produced.

This invention provides a method and catalyst for polymerizing acenaphthylene and indene and for the copolymerization of these materials with isobutylene.

This invention provides a process in which at least one of acenaphthylene and indene are polymerized by contacting the monomers under polymerization conditions with a catalyst having the general formula $$RAlX_2$$

wherein R is an alkyl, cycloalkyl, aryl radical or combinations thereof having from 1 to 10 carbon atoms and X is fluorine, chlorine, bromine or iodine.

Suitable catalysts include ethylaluminum dichloride, isobutylaluminum dichloride, methylaluminum diiodide, decylaluminum dibromide, cyclohexylaluminum difluoride, cyclodecylaluminum difluoride, phenylaluminum dibromide, benzylaluminum dichloride, 4-butylphenylaluminum dibromide, 3 - butylcyclohexylaluminum dichloride, 4 - cyclohexylbutylaluminum dibromide, 2-methylcyclobutylaluminum diiodide, cyclopentylmethylaluminum difluoride, 4-phenylbutylaluminum dichloride, and the like. Such compounds are prepared by methods known in the art and are also commercially available.

The method of this invention is carried out by contacting that material to be polymerized, or the materials to be copolymerized, optionally contained in a feedstream comprised of as much as about 95 weight percent of a nonreactive diluent with the catalyst at reaction temperatures in the range of about −100 to about 200° C., at a pressure sufficient to maintain the reaction mixture substantially in the liquid phase, generally from about 0.5 to about 10 atmospheres, for a period from about 10 minutes to about 48 hours. The catalyst is employed in an amount from about 1 to about 100 millimoles per hundred grams of the monomer in the feedstock, and is preferably employed in an amount from about 5 to about 30 millimoles. Suitable diluents include hydrocarbons inert under the process conditions such as alkanes, cycloalkanes, monocyclic aromatics and alkyl monocyclic aromatics.

In all instances, conventional polymerization techniques as employed in the solution polymerization of conjugated dienes are employed. Similarly, the polymer can be recovered by coagulation in alcohol.

The method of this invention is illustrated by the following runs. In all instances the catalyst level indicated is millimoles per hundred grams of monomer (mhm.).

EXAMPLE I

One hundred (100) parts by weight acenaphthylene were polymerized in 860 parts by weight of toluene diluent at two temperatures. Ethylaluminum dichloride catalyst in an amount of 15 millimoles per hundred grams of the acenaphthylene was employed for a contact time of about 16 hours.

For comparative purposes, runs were also conducted employing triisobutylaluminum, a well-known polymerization catalyst but ineffective in polymerizing acenaphthylene. In all examples, including those which follow, that material to be polymerized was introduced into the diluent and the catalyst was introduced into the mixture. Results were as follows:

| Catalyst | Temp., °F. | Acenaphthylene conversion, percent | Polymer inherent viscosity |
|---|---|---|---|
| Ethylaluminum dichloride | 14 | 100 | 0.12 |
| Do | 122 | 100 | 0.06 |
| Triisobutylaluminum | 14 | 0 | |
| Do | 122 | 0 | |

NOTE.—The polymer was separated and was found to have a melting point greater than 300° C. and a decomposition temperature of about 400° C.

These data illustrate the operability of the method of this invention and the unexpected results obtainable when employing the method and catalyst of this invention in view of the fact that triisobutylaluminum was totally ineffective in polymerizing acenaphthylene.

EXAMPLE II

One hundred (100) parts by weight of acenaphthylene were polymerized in 860 parts by weight of toluene diluent at various ethylaluminum dichloride catalyst levels and at 158° F. for 16 hours, with the following results:

| Catalyst level, mhm. | Acenaphthylene conversion, percent | Polymer inherent viscosity |
|---|---|---|
| 5 | 80 | |
| 10 | 96 | 0.07 |
| 15 | 100 | 0.06 |

NOTE.—These data indicate that maximum monomer conversion was attained at 15 millimoles of catalyst per 100 parts of monomer.

EXAMPLE III

Indene was polymerized with a catalyst of this invention, ethylaluminum dichloride. For comparative purposes, ethylaluminum sesquichloride and diethylaluminum chloride were employed separately as catalysts. All reactions were conducted with 100 parts by weight of indene in 860 parts by weight of toluene at two catalyst levels, at 158° F. for 16 hours. Results were as follows:

| Catalyst | Catalyst level, mhm. | Indene conversion, percent | Polymer inherent viscosity |
|---|---|---|---|
| Ethylaluminum dichloride | 15 | 60 | 0.11 |
| Do | 20 | 62 | |
| Ethylaluminum sesquichloride | 15 | Trace | |
| Do | 20 | Trace | |
| Diethylaluminum chloride | 15 | 0 | |
| Do | 20 | 0 | |

NOTE.—The indene polymer formed was compression molded into a clear film at 270° C.

These data indicate the unobvious effectiveness of the present invention in view of the ineffectiveness of the other two hydrocarbon aluminum chlorides in promoting polymerization.

EXAMPLE IV

Acenaphthylene and indene were copolymerized in a mixture comprised of 50 parts by weight of acenaphthylene, 50 parts by weight of indene and 860 parts by weight of toluene. This mixture was contacted with ethylaluminum dichloride as catalyst in separate runs at two different catalyst levels. Operating conditions in both runs were 158° F. and a contact time of 16 hours. Results were as follows:

| Catalyst level, mhm. | Monomer conversion, percent | Polymer inherent viscosity |
|---|---|---|
| 15 | 90 | 0.08 |
| 20 | 95 | 0.09 |

NOTE.—These data indicate the operability of the method of this invention when copolymerizing the cyclic compounds concerned.

The copolymer formed was separated and compression molded into an article having a melting point of about 350° C.

EXAMPLE V

Acenaphthylene and isobutylene were copolymerized employing ethylaluminum dichloride as the catalyst in a series of runs. In each instance, the indicated quantity of acenaphthylene was diluted with 860 parts by weight of toluene and the isobutylene was added to the mixture and the catalyst was introduced thereinto. Polymerization periods were about 16 hours. In certain runs, no acenaphthylene was employed for the purpose of indicating the level of isobutylene polymerization in its absence. Results were as follows:

| Run number | Acenaphthylene, parts by weight | Isobutylene, parts by weight | Temp., °F. | Conversion, weight percent |
|---|---|---|---|---|
| 1 | 0 | 100 | 41 | 20 |
| 2 | 30 | 70 | 41 | 52 |
| 3 | 50 | 50 | 41 | 70 |
| 4 | 70 | 30 | 41 | 80 |
| 5 | 0 | 100 | 86 | 10 |
| 6 | 30 | 70 | 86 | 38 |
| 7 | 50 | 50 | 86 | 60 |
| 8 | 70 | 30 | 86 | 70 |

NOTE.—In those instances when no acenaphthylene was present in the reaction mixture, the product was a sticky solid. The product produced in the presence of acenaphthylene as a particulate solid.

The above data indicate the operability of the method of this invention in polymerizing acenaphthylene and isobutylene in the presence of the previously-defined catalyst.

It will be evident from the foregoing that various modifications can be made to the method of this invention. Such, however, are considered as being within the scope of the invention.

What is claimed is:

1. A method for polymerizing acenaphthylene which comprises contacting acenaphthylene with a catalyst consisting essentially of a hydrocarbyl aluminum dihalide having the formula $RAlX_2$ in which R is a radical of at least one of alkyl, cycloalkyl and aryl containing from 1 to 10 carbon atoms and X is selected from the group consisting of fluorine, chlorine, bromine and iodine to form a reaction mixture substantially in the liquid phase at polymerization conditions and to polymerize said acenaphthylene and recovering the polymer, said catalyst being employed in an amount within the range of from about 1 to about 100 millimoles per hundred grams of acenaphthylene.

2. The method as defined in claim 1 in which said polymerization conditions include a temperature in the range of from about —100° to about 200° C., a pressure sufficient to maintain said reaction mixture in the liquid phase, a polymerization period within the range of about 10 minutes to about 48 hours, the amount of said catalyst being within the range of from about 1 to about 100 millimoles per hundred grams of said hydrocarbon.

3. The method of claim 1 in which said polymerization is conducted in a nonreactive diluent comprising up to 95 weight percent of said reaction mixture.

4. The method of claim 1 in which acenaphthylene is polymerized in toluene employing ethylaluminum dichloride as said catalyst, said polymerization being conducted at about 122° F. for a period of about 16 hours.

References Cited

UNITED STATES PATENTS

| | | | |
|---|---|---|---|
| 2,300,064 | 10/1942 | Rosen | 260—42 |
| 2,387,517 | 10/1945 | Kraus | 260—93 |
| 3,361,725 | 1/1968 | Parker | 260—85.3 |
| 3,446,785 | 3/1969 | Stafford | 260—93.1 |
| 2,510,647 | 6/1950 | Miller | 260—33.2 |
| 2,563,524 | 8/1951 | Flowers | 260—83.7 |
| 2,768,147 | 10/1956 | Meis | 260—23 |
| 2,803,622 | 8/1957 | Chapin | 260—88.2 |
| 2,850,488 | 9/1958 | Baxter | 260—88.1 |

FOREIGN PATENTS

| | | |
|---|---|---|
| 1,224,044 | 3/1967 | Germany. |

OTHER REFERENCES

Chemical Abstracts, vol. 58:13861h (1963), Perchloric Acid and Its Compounds as Catalysts in Organic Synthesis.

Chemical Abstracts, vol. 61:2013h (1964), Improvements Relating to Polymers and Copolymers of Indene and Process for Preparation.

Friedel-Crafts and Related Reactions, edited by George A Olah, vol. 1, 1963, Interscience Publishers, div. of John Wiley & Sons, pp. 88–90.

Encyclopedia of Polymer Science and Technology, vol. 3, Catalysts, pp. 30, 36–40, 1965, John Wiley & Sons, Inc.

JOSEPH L. SCHOFER, Primary Examiner

R. S. BENJAMIN, Assistant Examiner

U.S. Cl. X.R.
260—80.78, 88.2 C